(12) United States Patent
Sewell

(10) Patent No.: US 6,308,795 B2
(45) Date of Patent: *Oct. 30, 2001

(54) RADIATOR MOUNTING ARRANGEMENT FOR A WORK MACHINE

(75) Inventor: A. J. Sewell, Northumberland (GB)

(73) Assignee: Caterpillar Inc., Peoria, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,879

(22) Filed: Dec. 3, 1998

(51) Int. Cl.$^7$ ................................... B60K 11/04

(52) U.S. Cl. ........................................ 180/68.4

(58) Field of Search ................... 180/68.4, 68.6, 180/68.1, 68.2; 165/41

(56) References Cited

U.S. PATENT DOCUMENTS

| | | |
|---|---|---|
| 1,263,543 | 4/1918 | Fageol . |
| 1,357,397 | 11/1920 | Gerber . |
| 1,406,163 * | 2/1922 | Alborn ................................ 180/65.2 |
| 2,228,550 | 1/1941 | Young .................................. 257/136 |
| 2,626,783 | 1/1953 | Fritzberg ............................. 257/146 |
| 2,650,799 | 9/1953 | Fritzberg ............................. 257/146 |
| 3,406,751 | 10/1968 | Kreul et al. ......................... 165/151 |
| 3,540,540 | 11/1970 | Schwab ................................ 180/68 |
| 3,616,871 * | 11/1971 | West ................................... 180/68.2 |
| 3,786,891 * | 1/1974 | Vogelaar et al. ................... 180/68.4 |
| 3,865,205 * | 2/1975 | Swanson . |
| 3,964,458 * | 6/1976 | Strauss et al. ...................... 165/41 X |
| 4,071,009 * | 1/1978 | Kraina ............................. 180/68.4 X |
| 4,121,683 * | 10/1978 | Kohriyama ......................... 180/68.4 |
| 4,182,404 * | 1/1980 | Beveridge et al. .................... 165/41 |
| 4,226,217 * | 10/1980 | Haslbeck et al. . |
| 4,579,090 * | 4/1986 | Konrath et al. ................ 180/68.4 X |
| 4,590,891 * | 5/1986 | Fujikawa et al. .............. 180/68.4 X |
| 4,696,361 | 9/1987 | Clark et al. ......................... 180/68.4 |
| 4,730,664 | 3/1988 | Forsthuber et al. .................. 165/41 |
| 4,744,433 * | 5/1988 | Takeuchi et al. .................... 180/68.4 |
| 4,815,550 * | 3/1989 | Mather et al. ...................... 180/68.1 |
| 4,898,318 * | 2/1990 | Shiga et al. . |
| 4,938,303 | 7/1990 | Schaal et al. ....................... 180/68.1 |
| 5,042,602 * | 8/1991 | Nakatani et al. ................... 180/68.1 |
| 5,129,446 | 7/1992 | Beamer ................................ 165/41 |
| 5,341,870 | 8/1994 | Hughes et al. ...................... 165/110 |
| 5,490,574 * | 2/1996 | Ishiizumi et al. ................... 180/68.1 |
| 5,499,690 * | 3/1996 | Shearn et al. ....................... 180/68.4 |
| 5,613,551 * | 3/1997 | Rhodes . |
| 5,678,648 * | 10/1997 | Imanishi et al. .................... 180/68.1 |
| 5,695,007 | 12/1997 | Fauconnier et al. ................ 165/128 |

FOREIGN PATENT DOCUMENTS

5105114 * 4/1993 (JP) .

OTHER PUBLICATIONS

JC Whitney Catalog 578C, pp. 196 and 197, Mar. 1995.*

* cited by examiner

*Primary Examiner*—Brian L. Johnson
*Assistant Examiner*—Bryan Fischmann
(74) *Attorney, Agent, or Firm*—Bradford G. Addison

(57) ABSTRACT

A radiator mounting arrangement for a work machine is described. The radiator mounting arrangement includes a work machine having a forward end, a rearward end, and a lateral sidewall interposed between the forward end and the rearward end. The radiator mounting arrangement also includes a radiator having an inner side edge. The inner side edge has an upper end and a lower end. The radiator is secured to the work machine such that (i) the inner side edge of the radiator is positioned adjacent to the lateral sidewall, (ii) the upper end of the inner side edge is positioned a distance D1 from the lateral sidewall, (iii) the lower end of the inner side edge is positioned a distance D2 from the lateral sidewall, and (iv) the distance D1 is greater than the distance D2 so that the inner side edge and the lateral sidewall define an angle a therebetween.

8 Claims, 2 Drawing Sheets

RADIATOR MOUNTING ARRANGEMENT FOR A WORK MACHINE

TECHNICAL FIELD OF THE INVENTION

The present invention relates generally to radiators, and more particularly to a radiator mounting arrangement for a work machine.

BACKGROUND OF THE INVENTION

A work machine, such as a telescopic handler, typically includes a cab assembly and an engine enclosure attached to a main frame. The engine enclosure houses the radiator and the engine of the work machine. In addition, the engine enclosure is attached to the main frame such that the engine enclosure is adjacent to the cab assembly and interposed between a front and rear wheel of the work machine. The above described arrangement results in the work machine having a relatively compact size. Having a relatively compact size facilitates the ability of the work machine to work and maneuver in close quarters (e.g. when the work machine is being utilized to handle hay bales in a barn).

However, a draw back of the aforementioned arrangement is that the engine enclosure must be large enough to accommodate the engine and the radiator therein. Having a relatively large enclosure tends to obstruct the view of an operator positioned within the cab assembly when operating the work machine For example, if the engine enclosure is positioned on the right hand side of an operator located in the cab assembly, then the view of the operator in that direction will be obstructed by the enclosure to a certain degree. Obstructing the view of the operator is an annoyance and decreases the efficiency of the work machine in performing various work functions.

Some work machines may utilize smaller radiators in an attempt to address this draw back. However, this approach suffers from the draw back that relatively small radiators do not have the cooling capacity of full size radiators.

What is needed therefore is a radiator mounting arrangement for a work machine which overcomes the above-mentioned drawback.

DISCLOSURE OF THE INVENTION

In accordance with a first embodiment of the present invention, there is provided a work machine. The work machine includes a main frame and an operator seat supported by the main frame. The work machine also includes a radiator supported by the main frame and including a cooling core, wherein (i) the cooling core defines a fluid flow-through surface which is vertically oriented when supported by the main frame, (ii) the cooling core includes a substantially linear upper edge which defines a first line L1, (iii) a line L2 is defined by a horizontal line, (iv) an angle σ is defined between the first line L1 and the second line L2, and (v) $2.0° \leq \sigma \leq 88.0°$.

In accordance with a second embodiment of the present invention, there is provided a work machine having a forward end, a rearward end, and a lateral sidewall interposed between the forward end and the rearward end. The work machine includes a main frame and an operator seat supported by the main frame. The work machine also includes a radiator having a cooling core. The cooling core has an inner side edge. The inner side edge has an upper end and a lower end, wherein the radiator is supported by the main frame such that (i) the cooling core defines a fluid flow-through surface which is vertically orientated, (ii) the upper end of the inner side edge is positioned a distance D1 from the lateral sidewall, (iii) the lower end of the inner side edge is positioned a distance D2 from the lateral sidewall, and (iv) the distance D1 is greater than the distance D2.

In accordance with a third embodiment of the present invention there is provided a work machine having a forward end, a rearward end, and a wall portion. The work machine also includes a support member extending outwardly from the wall portion. The work machine also includes a radiator having a cooling core. The cooling core has (i) a fluid flow-through surface and (ii) a lower side edge, the lower side edge has an inner end and an outer end, wherein the radiator is secured to the work machine such that (i) the cooling core defines a fluid flow-through surface which is vertically orientated, (ii) the inner end of the lower side edge is positioned a distance D3 from the support member, (iii) the outer end of the lower side edge is positioned a distance D4 from the support member, and (iv) the distance D3 is greater than the distance D4.

BEST MODE FOR CARRYING OUT THE INVENTION

Figure 1:
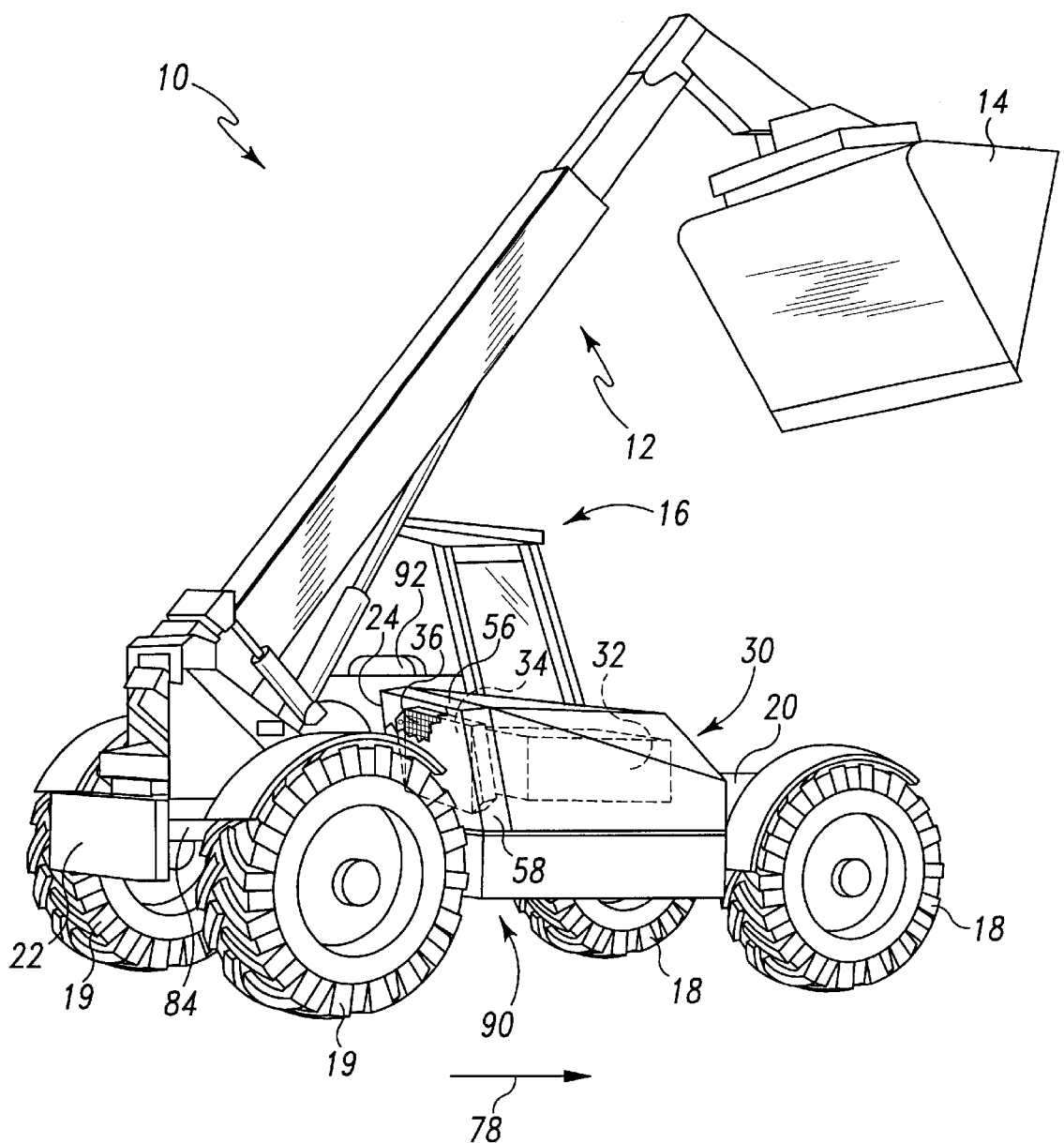
FIG. 1 is a perspective view of a work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
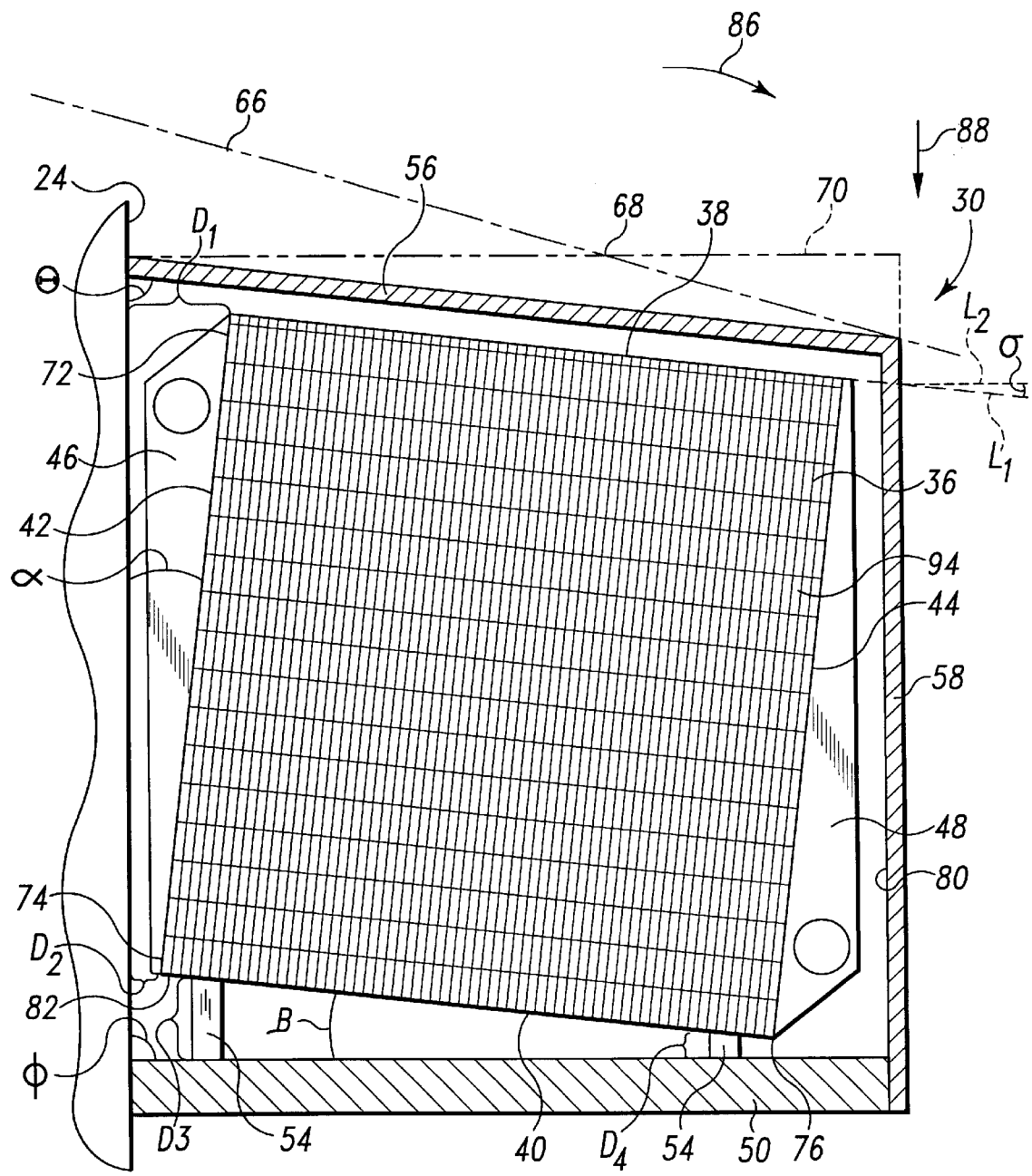
FIG. 2 is an elevational view showing the radiator of the work machine of FIG. 1 positioned within the radiator chamber of the enclosure.

Referring now to FIGS. 1 and 2, there is shown a work machine 10 which incorporates the features of the present invention therein. Work machine 10 includes a forward end 20, a rearward end 22, a main frame 84, a boom assembly 12, and an implement 14. Work machine 10 also includes a pair of front wheels 18 and a pair of rear wheels 19. Work machine 10 further includes a right lateral side 90, a left lateral side (not shown), a lateral sidewall 24, a support member 50, an enclosure 30, an engine 32, a radiator 34, a cab assembly 16, and an operator seat 92 positioned within cab assembly 16.

Boom assembly 12 is secured to main frame 84 such that an end of boom assembly 12 is adjacent to rearward end 22 of work machine 10. Implement 14 is attached to the other end of boom assembly 12. Front wheels 18 and rear wheels 19 are rotatably secured to main frame 84. Lateral sidewall 24 is secured to main frame 84 such that lateral sidewall 24 is positioned on right lateral side 90 and interposed between the front wheel 18 and the rear wheel 19 which are on the right lateral side 90 of work machine 10. It should be understood that positioning lateral sidewall 24 in the above described manner also interposes lateral sidewall 24 between forward end 20 and rearward 22 of work machine 10. Support member 50 is also secured to main frame 84 such that support member 50 extends outwardly from lateral sidewall 24. Support member 50 is further positioned relative to lateral sidewall 24 such that an angle φ is defined therebetween. Preferably, angle φ is substantially a 90° angle. However, it should be understood that angle φ can have any value but particularly those values between 90° and 100°. It should also be understood that support member 50 can be positioned relative to lower side edge 40 such that lower side edge 40 and support member 50 are in a substantially parallel relationship, thus causing β to be 0°. Operator seat 92 is supported by main frame 84.

As shown more clearly in FIG. 2, enclosure 30 includes a top cover 56 and a side cover 58 attached to an end of top cover 56. Enclosure 30 is positioned relative to lateral sidewall 24 and support member 50 such that top cover 56 is attached to and extends outwardly from lateral sidewall 24. Enclosure 30 is further positioned such that an end of side cover 58 contacts an end of support member 50. Positioning enclosure 30 in the above described manner results in top cover 56, side cover 58, and lateral sidewall 24 collectively defining a radiator chamber 80.

Radiator 34 includes a cooling core 94 which defines a fluid flow-through surface 36, a lower side edge 40 having an inner end 82 and an outer end 76, an inner side edge 42 having an upper end 72 and a lower end 74, an upper side edge 38, and an outer side edge 44. It should be understood that lower side edge 40, inner side edge 42, upper side edge 38, and outer side edge 44 are all substantially linear. Radiator 34 also includes an fluid tank 46 secured to inner side edge 42 and an fluid tank 48 secured to outer edge 44 of radiator 34. Fluid tanks 46 and 48 increase the cooling capacity of radiator 34 by containing additional volumes of a cooling fluid and are necessary to distribute the cooling fluid across the depth and height of cooling core 94.

It should be understood that preferably upper side edge 38, lower side edge 40, inner side edge 42, and outer side edge 44 of radiator 34 collectively define a parallelogram. More preferably, upper side edge 38, lower side edge 40, inner side edge 42, and outer side edge 44 of radiator 34 collectively define a parallelogram that has the shape of a rectangle. Having upper side edge 38, lower side edge 40, inner side edge 42, and outer side edge 44 of radiator 34 collectively define a parallelogram that has the shape of a rectangle decreases the manufacturing cost of radiator 34.

Radiator 34 is positioned within radiator chamber 80 and secured to support member 50 with supports 54. Radiator 34 is secured to support member 50 such that radiator 34 is positioned relative to work machine 10 such that radiator 34 is interposed between the forward wheel 18 and the rearward wheel 19 which are positioned on right lateral side 90 of work machine 10. Radiator 34 is also secured to support member 50 such that (i) inner side edge 42 of radiator 34 is positioned adjacent to lateral sidewall 24, (ii) lower side edge 40 of radiator 34 is positioned adjacent to support member 50 such that inner end 82 is adjacent to lateral sidewall 24, and (iii) fluid flow-through surface 36 faces forward end 20 or rearward end 22 of work machine 10. In particular, radiator 34 is preferentially positioned relative to work machine 10 such that a fan (not shown) interposed between radiator 34 and engine 32 draws air through fluid flow-through surface 36 in the direction indicated by arrow 78 (see FIG. 1). However, it should be understood that other fan arrangements are contemplated. For example, the fan can be positioned such that the fan blows air through fluid flow-through surface 36. Radiator 34 is secured to support member 50 such that (i) upper end 72 of inner side edge 42 is positioned a distance D1 from lateral sidewall 24, (ii) lower end 74 of inner side edge 42 is positioned a distance D2 from lateral sidewall 24, and (iii) distance D1 is greater than distance D2 so that inner side edge 42 and lateral sidewall 24 define an angle α therebetween.

Preferably, $2.0° \leq \alpha \leq 10.0°$. More preferably angle α is about 6.2°. Radiator 34 is further secured to support member 50 such that (i) inner end 82 of lower side edge 40 is positioned a distance D3 from support member 50, (ii) outer end 76 of lower side edge 40 is positioned a distance D4 from support member 50, and (iii) distance D3 is greater than distance D4 so that lower side edge 40 and support member 50 define an angle β therebetween. Preferably $2.0° \leq \beta \leq 10.0°$. More preferably, β is about 6.2°. However, as discussed above, β can be equal to 0° if lower side edge 40 and support member 50 are positioned in a substantially parallel relationship. Radiator 34 is also secured to support member 50 such that (i) fluid flow-through surface 36 is vertically oriented, (ii) upper edge 38 defines a first line Li, (iii) a line L2 is defined by a horizontal line, (iv) an angle σ is defined between first line L1 and second line L2, and (v) $2.0° \leq \sigma \leq 88.0°$. Preferably, $2.0° \leq \sigma \leq 10.0°$ or $80.0° \leq \sigma \leq 88.0°$.

It should be understood that having outer end 76 positioned relative to support member 50 such that (i) outer end 76 contacts support member 50 or (ii) outer end 76 is positioned past support member 50 is also contemplated as long as lower side edge 40 is positioned at an angle relative to support member 50. Having outer end 76 contacting or positioned past support member 50 still allows (i) distance D3 to be greater than distance D4 and (ii) lower side edge 40 to be positioned at an angle relative to support member 50 since in this situation the distance D4 is essentially equal to zero, and therefore, is less than the distance D3. The same holds true for lower end 74 and lateral sidewall 24. In particular, having lower end 74 positioned relative to lateral sidewall 24 such that (i) lower end 74 contacts lateral sidewall 24 or (ii) lower end 74 is positioned past lateral sidewall 24 is also contemplated as long as inner side edge 42 of radiator 34 is angled relative to lateral sidewall 24 in the previously discussed manner.

It should be appreciated that top cover 56 of enclosure 30 is positioned relative to upper side edge 38 and lateral sidewall 24 such that top cover 56 and upper side edge 38 of radiator 34 are in a substantially parallel relationship so that top cover 56 and lateral sidewall 24 define an acute angle Θ therebetween.

INDUSTRIAL APPLICABILITY

As shown in FIG. 2, positioning radiator 34 relative to lateral sidewall 24 and support member 50 in the above described manner (i.e. rotating radiator 34 relative to lateral sidewall 24 and support member 50 in the direction indicated by arrow 86) allows top cover 56 of enclosure 30 to be angled downward relative to lateral sidewall 24 in the direction indicated by arrow 88. Having top cover enclosure 30 angled downward relative lateral sidewall 24 enhances the ability of an operator (not shown) to see over enclosure 30 while positioned in cab assembly 16 (see FIG. 1).

In particular, as shown in FIG. 2, top cover 56 is positioned such that the line of sight of the operator, as represented by line 66, is relatively unobstructed as compared to other radiator mounting arrangements. Specifically, other radiator mounting arrangements mount the radiator such that (i) the inner side edge thereof is in a substantially parallel relationship with lateral sidewall 24 and (ii) a substantially right angle is defined between the upper side edge of the radiator and lateral sidewall 24 (i.e. there is no rotation of the radiator relative to lateral sidewall 24 and support member 50 in the direction indicated by arrow 86). Therefore, in order to accommodate the radiator in the radiator chamber, the top cover 70 (shown in phantom in FIG. 2) of the enclosure of these types of radiator mounting arrangements must be positioned relative to lateral sidewall 24 such that a substantially right angle is defined between top cover 70 and lateral sidewall 24. Having a substantially right angle defined between the top cover 70 and lateral sidewall 24 decreases the ability of the operator to see over the enclosure while positioned in cab assembly 16. Specifically, the line of sight of the operator, as represented by line 66, is obstructed by top cover 70 at a point 68.

Therefore, it should be appreciated that the present invention allows work machine 10 to be equipped with an enclosure 30 and a full size radiator 34 positioned within enclosure 30 while still enhancing the ability of the operator to see any obstacles positioned around work machine 10.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected. For example, the mounting arrangement of the present invention can be applied a radiator that is remote to the engine, e.g. tucked inside a chassis or other confined space. Moreover, the mounting arrangement of the present invention can be used with a radiator positioned at the opposite end of enclosure 30.

What is claimed is:

1. A work machine having a forward end, a rearward end, and a lateral sidewall interposed between said forward end and said rearward end, comprising:

a main frame;

an operator seat supported by said main frame; and a radiator having a cooling core, said cooling core having an inner side edge, and said inner side edge having an upper end and a lower end; and an enclosure attached to said lateral sidewall, wherein (i) said enclosure and said lateral sidewall collectively define a radiator chamber, (ii) said radiator is positioned within said radiator chamber, (iii) said radiator is supported by said main frame such that (A) said cooling core defines a fluid flow-through surface which is substantially vertically positioned, (B) said upper end of said inner edge is positioned a distance D1 from said lateral sidewall, (C) said lower end of said inner side edge is positioned a distance D2 from said lateral sidewall, (D) said distance D1 is greater than said distance D2, (E) said cooling core also has an outer side edge, an upper side edge, and a lower side edge, (F) said upper side edge, said lower side edge, said inner side edge, and said outer side edge collectively define a parallelogram, (iv) said enclosure includes a top cover extending outwardly from said lateral sidewall, and (v) said top cover and said upper side edge of said cooling core are in a substantially parallel relationship such that said top cover and said lateral sidewall define an acute angle therebetween.

2. The work machine of claim 1 further comprising:

a first fluid tank secured to said inner side edge of said cooling core; and a second fluid tank secured to said outer edge of said cooling core.

3. The work machine of claim 1 further comprising a forward wheel and a rearward wheel, wherein:

said radiator is interposed between said forward wheel and said rearward wheel, and said forward wheel and said rearward wheel are each positioned on a first lateral side of said work machine.

4. A work machine having a forward end, a rearward end, and a wall portion, comprising:

a support member extending outwardly from said wall portion;

a radiator having a cooling core, said cooling core having (i) a fluid flow-through surface and (ii) a lower side edge, said lower side edge having an inner end and an outer end; and an enclosure attached to said wall portion, wherein (i) said enclosure and said wall portion collectively define a radiator chamber, (ii) said radiator is positioned within said radiator chamber, (iii) said radiator is secured to said work machine such that (A) said cooling core defines a fluid flow-through surface which is substantially vertically positioned, (B) said inner end of said lower side edge is positioned a distance D3 from said support member, (C) said outer end of said lower side edge is positioned a distance D4 from said support member, (D) said distance D3 is greater than said distance D4, (iv) said enclosure includes a top cover extending outwardly from said wall portion, and (v) said top cover and said upper side edge of said cooling core are in a substantially parallel relationship such that said top cover and said wall portion define an acute angle therebetween.

5. The work machine of claim 4, wherein:

an angle $\beta$ is defined between said lower side edge and said support member, and $2.0° \leq \beta \leq 10.0°$.

6. The work machine of claim 4, wherein:

said cooling core also has an outer side edge, an upper side edge, and a inner side edge, and said upper side edge, said lower side edge, said inner side edge, and said outer side edge collectively define a parallelogram.

7. The work machine of claim 6, wherein:

said parallelogram possess a rectangular shape.

8. The work machine of claim 4, wherein:

said support member is positioned relative to said wall portion such that said support member and said wall portion define a substantially 90° angle therebetween.

* * * * *